No. 858,421. PATENTED JULY 2, 1907.
H. SECKENDORFF.
TIME CONTROLLED EGG BOILER.
APPLICATION FILED JULY 28, 1906.
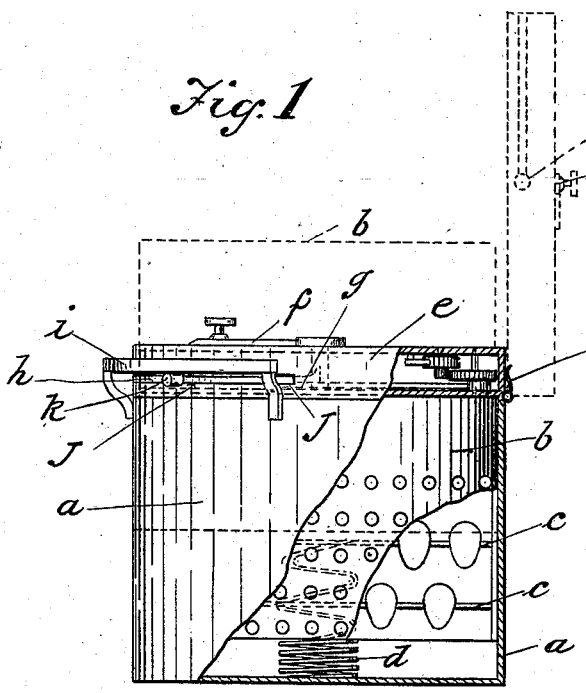
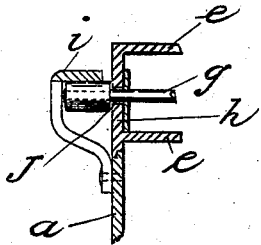
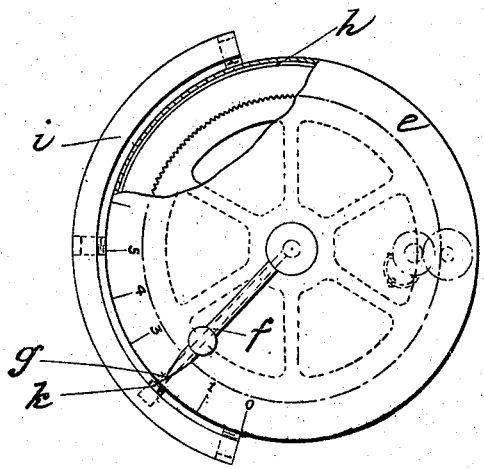
Witnesses:
Inventor:
H. Seckendorff
per R. Haddan
Attorney

UNITED STATES PATENT OFFICE.

HERMANN SECKENDORFF, OF HANOVER, GERMANY.

TIME-CONTROLLED EGG-BOILER.

No. 858,421.  Specification of Letters Patent.  Patented July 2, 1907.

Application filed July 28, 1906. Serial No. 328,268.

*To all whom it may concern:*

Be it known that I, HERMANN SECKENDORFF, a subject of the German Emperor, residing at Hanover, in Germany, have invented a certain new and useful Time-Controlled Egg-Boiler, of which the following is a specification.

This invention has reference to time controlled vessels to be used for cooking purposes and particularly designed for use as automatic egg-boilers.

So-called egg-boilers are known, in which a spring-actuated support for the egg or eggs is adapted to be retained under water for a predetermined length of time by means of a locking device controlled by clockwork. In these known egg-boilers the clockwork is arranged at the side or top of the cooking vessel, so that it is exposed and liable to be damaged. Moreover the egg-support is suddenly propelled upwards by the spring when unlocked, so that the eggs are liable to be damaged.

The purpose of the present invention is to obviate these disadvantages and to provide a time-controlled vessel more especially for use as an egg-boiler which is practical and convenient for household use.

The invention is illustrated in the annexed drawing, in which

Figure 1 is a side-view partly broken away, Fig. 2 a plan-view with a portion of the cover broken away, and Fig. 3 a detail-view of the locking-device.

The cooking-vessel $a$ is constructed of any suitable material and contains an inner movable receptacle $b$ which may be constructed of perforated metal which fits closely against the walls of the vessel $a$ and is acted on by a spring $d$ tending to press it upwards. Plates or trays $c$ provided with holes for the reception of eggs are fixed in the receptacle $b$. The vessel $a$ is provided with a hinged lid $e$ containing a chamber within which is arranged clockwork adapted to operate a hand or pointer $f$. The chamber containing the clockwork is steam-proof. The pointer $f$ also serves for winding up the clock-work, and a pin $g$ is connected to the pointer in such a manner that it is displaced when the pointer is moved. The clock-work is of the simplest possible construction, the driving-wheel being large and the pinion and escapement-wheel small. An internal or external strip $h$ of aluminium or the like bent to conform to the circumference of the lid covers a slot J in which moves a roller $k$ mounted on the pin $g$ to reduce friction.

For cooking eggs the vessel $a$ is filled with water to a certain level and this water is raised to boiling-point, whereupon the receptacle $b$ containing the eggs is inserted into the vessel, the spring $d$ being compressed and the lid $e$ closed. The pointer $f$ is then adjusted for a certain period of cooking, this being effected with the aid of a scale marked on the lid, and the pin $g$ with the roller $k$ thereon is caused to engage a curved plate $i$ in such a manner that the lid is held down. The expansion of the clock-spring causes the pointer $f$ to move toward its position of rest, so that at the end of the period for which the device was adjusted the pin $g$ with the roller $k$ attached thereto clears the curved plate $i$ and allows the lid to be raised by the spring-actuated receptacle $b$. The automatic brake-action due to the friction between the lid and the receptacle $b$ causes the latter to ascend slowly from the water with the eggs. The hinge of the lid may, however, be provided in addition with a brake-spring $l$ to prevent upward movement and to secure the gradual ascent of the eggs, more particularly in the case of an apparatus of large size.

The apparatus described can also be used for other purposes than for cooking eggs, for example in the carrying out of chemical processes and the like.

What I claim as my invention and desire to secure by Letters Patent of the United States is:—

1. A time controlled vessel adapted for use as an egg-boiler comprising in combination a cooking vessel, a lid hinged thereto, a spring-actuated egg-receptacle movable frictionally in a vertical direction in said cooking vessel, clock-work located in a steam-proof chamber within the lid, and a lock for said lid operated by said clockwork, said lid acting through its own weight and that of the clock-work and by the friction of its inner surface with the egg-receptacle as a brake on the upward movement of said receptacle.

2. A time controlled vessel adapted for use as an egg-boiler comprising in combination a cooking vessel, a lid hinged thereto, a spring-actuated receptacle movable frictionally in a vertical direction in said cooking vessel, clock-work located in a steam-proof chamber within the lid, and a lock for said lid operated by said clock-work, said lid acting through its own weight and that of the clock-work and by the friction of its inner surface with the egg-receptacle as a brake on the upward movement of said receptacle and said lock comprising a movable pin and an anti-friction roller thereon bearing under a curved plate on the cooking vessel.

In witness whereof I have signed this specification in the presence of two witnesses.

HERMANN SECKENDORFF.

Witnesses:
  HENRY T. FULLER,
  ROBERT GRIMSHAW.